United States Patent
Kasamatsu et al.

(10) Patent No.: US 11,967,733 B2
(45) Date of Patent: Apr. 23, 2024

(54) NON-AQUEOUS ELECTROLYTE SECONDARY BATTERY SEPARATOR, NON-AQUEOUS ELECTROLYTE SECONDARY BATTERY, AND METHOD FOR PRODUCING NON-AQUEOUS ELECTROLYTE SECONDARY BATTERY SEPARATOR

(71) Applicant: SANYO Electric Co., Ltd., Daito (JP)

(72) Inventors: Shinji Kasamatsu, Tokushima (JP); Hideki Morishima, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 867 days.

(21) Appl. No.: 16/980,088

(22) PCT Filed: Feb. 13, 2019

(86) PCT No.: PCT/JP2019/005073
§ 371 (c)(1),
(2) Date: Sep. 11, 2020

(87) PCT Pub. No.: WO2019/176421
PCT Pub. Date: Sep. 19, 2019

(65) Prior Publication Data
US 2021/0020889 A1 Jan. 21, 2021

(30) Foreign Application Priority Data

Mar. 16, 2018 (JP) ................ 2018-049821

(51) Int. Cl.
*H01M 50/449* (2021.01)
*B32B 27/08* (2006.01)
*B32B 27/32* (2006.01)
*B32B 27/34* (2006.01)
*H01M 10/0525* (2010.01)
*H01M 50/403* (2021.01)
*H01M 50/409* (2021.01)
*H01M 50/411* (2021.01)
*H01M 50/417* (2021.01)
*H01M 50/423* (2021.01)
*H01M 50/443* (2021.01)
*H01M 50/446* (2021.01)
*H01M 50/451* (2021.01)

(52) U.S. Cl.
CPC .......... *H01M 50/449* (2021.01); *B32B 27/08* (2013.01); *B32B 27/32* (2013.01); *B32B 27/34* (2013.01); *H01M 10/0525* (2013.01); *H01M 50/403* (2021.01); *H01M 50/409* (2021.01); *H01M 50/411* (2021.01); *H01M 50/417* (2021.01); *H01M 50/423* (2021.01); *H01M 50/443* (2021.01); *H01M 50/446* (2021.01); *H01M 50/451* (2021.01); *B32B 2457/10* (2013.01)

(58) Field of Classification Search
None
See application file for complete search history.

(56) References Cited

U.S. PATENT DOCUMENTS

| | | | |
|---|---|---|---|
| 2014/0087233 A1* | 3/2014 | Hong | ............. H01M 50/489 429/144 |
| 2017/0141372 A1 | 5/2017 | Suzuki et al. | |

FOREIGN PATENT DOCUMENTS

| | | |
|---|---|---|
| CN | 109950456 A | 6/2019 |
| JP | 2001-023600 A | 1/2001 |
| JP | 2003-040999 A | 2/2003 |
| JP | 2011-216257 A | 10/2011 |
| JP | 2011-216318 A | 10/2011 |
| JP | 2011-258462 A | 12/2011 |
| JP | 2017-98239 A | 6/2017 |

OTHER PUBLICATIONS

Extended (Supplementary) European Search Report dated Mar. 29, 2021, issued in counterpart EP Application No. 19767665.3. (8 pages).
International Search Report dated May 21, 2019, issued in counterpart application No. PCT/JP2019/005073, with English translation. (4 pages).

* cited by examiner

*Primary Examiner* — Gregg Cantelmo
(74) *Attorney, Agent, or Firm* — WHDA, LLP

(57) ABSTRACT

An object of the present disclosure is to provide a nonaqueous electrolyte secondary battery separator which has high heat resistance and is resistant to the detachment of a heat resistant layer. A nonaqueous electrolyte secondary battery according to an example embodiment includes a positive electrode, a negative electrode, and a separator interposed between the positive electrode and the negative electrode. The separator includes a polyolefin substrate and a heat resistant layer disposed on a side of the substrate. The heat resistant layer includes an aramid resin, and the aramid resin has a ratio (B/A) of 0.94 to 1.14 wherein A is the absorbance at a wavelength of 1318 cm$^{-1}$ and B is the absorbance at a wavelength of 1650 cm$^{-1}$ in an infrared absorption spectrum obtained by infrared spectroscopic measurement.

8 Claims, 1 Drawing Sheet

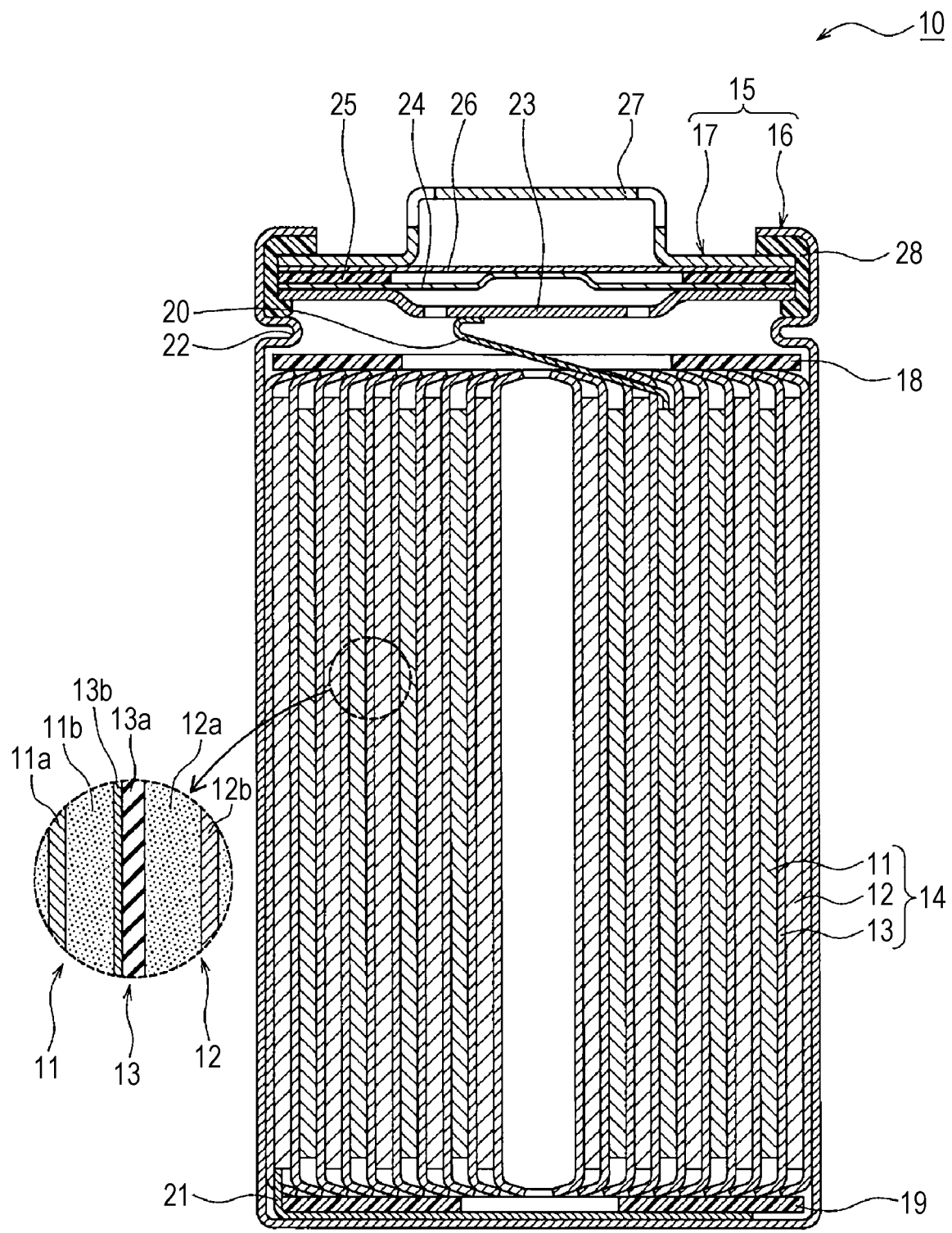

NON-AQUEOUS ELECTROLYTE SECONDARY BATTERY SEPARATOR, NON-AQUEOUS ELECTROLYTE SECONDARY BATTERY, AND METHOD FOR PRODUCING NON-AQUEOUS ELECTROLYTE SECONDARY BATTERY SEPARATOR

TECHNICAL FIELD

The present disclosure relates to a nonaqueous electrolyte secondary battery separator, a nonaqueous electrolyte secondary battery, and a method for producing nonaqueous electrolyte secondary battery separators.

BACKGROUND ART

Nonaqueous electrolyte secondary battery separators are conventionally known which have a heat resistant layer including a highly heat resistant resin on the surface of a porous polyolefin substrate. For example, PTLs 1 and 2 disclose nonaqueous electrolyte secondary battery separators which have a heat resistant layer including an aromatic polyamide. In PTLs 1 and 2, the aromatic polyamides for constituting the heat resistant layers are exemplified by, for example, para-aramid resins and meta-aramid resins.

CITATION LIST

Patent Literature

PTL 1: Japanese Published Unexamined Patent Application No. 2001-23600
PTL 2: Japanese Published Unexamined Patent Application No. 2003-40999

SUMMARY OF INVENTION

Technical Problem

Incidentally, heat resistant layers in nonaqueous electrolyte secondary battery separators require high heat resistance allowing the layer to maintain its shape in the event of abnormal heating of the battery, and also require good adhesion with respect to a substrate. Unfortunately, heat resistant layers made of para-aramid resins are low in film strength and flexibility, and easily come off due to a frictional force exerted thereon by, for example, a feed roller when the separator is fed during the fabrication of an electrode assembly. Further, heat resistant layers made of meta-aramid resins have a low heat resistant temperature, and the resins are decomposed when abnormal heating occurs in batteries, with the frequent result that the separators are thermally shrunk or broken.

Solution to Problem

An aspect of the present disclosure resides in a nonaqueous electrolyte secondary battery separator including a porous polyolefin substrate and a heat resistant layer disposed on a side of the substrate. In the nonaqueous electrolyte secondary battery separator, the heat resistant layer includes an aramid resin, and the aramid resin has a ratio (B/A) of 0.94 to 1.14 wherein A is the absorbance at a wavelength of 1318 cm$^{-1}$ and B is the absorbance at a wavelength of 1650 cm$^{-1}$ in an infrared absorption spectrum obtained by infrared spectroscopic measurement.

Another aspect of the present disclosure resides in a method for producing a nonaqueous electrolyte secondary battery separator including a polyolefin substrate and a heat resistant layer disposed on a side of the substrate. The method for producing a nonaqueous electrolyte secondary battery separator includes a step of dissolving a meta-aramid resin into a solution of a para-aramid resin to prepare a mixed solution of the para-aramid resin and the meta-aramid resin, and a step of applying the mixed solution onto a side of the substrate to form the heat resistant layer.

Advantageous Effects of Invention

The nonaqueous electrolyte secondary battery separator provided according to one aspect of the present disclosure has high heat resistance and is resistant to the detachment of the heat resistant layer.

BRIEF DESCRIPTION OF DRAWING

FIG. 1 is a sectional view of a nonaqueous electrolyte secondary battery according to an example embodiment.

DESCRIPTION OF EMBODIMENTS

The present inventors have successfully invented a nonaqueous electrolyte secondary battery separator which has high heat resistance and is resistant to the detachment of a heat resistant layer, by forming the heat resistant layer using an aramid resin having a ratio (B/A) of 0.94 to 1.14 wherein A is the absorbance at a wavelength of 1318 cm$^{-1}$ and B is the absorbance at a wavelength of 1650 cm$^{-1}$ in an infrared absorption spectrum obtained by infrared spectroscopic measurement. An example embodiment of the present disclosure will be described in detail hereinbelow.

In the following, an example embodiment of a nonaqueous electrolyte secondary battery according to the present disclosure is illustrated taking as an example a cylindrical battery in which a wound electrode assembly 14 is accommodated in a cylindrical battery case 15. However, the battery may be other form of a battery such as a prismatic battery having a prismatic battery case, or a laminate battery having a battery case composed of a laminate sheet in which a metal layer and a resin layer are stacked together. Further, the electrode assembly may be a multilayer structure in which a plurality of positive electrodes and a plurality of negative electrodes are stacked on top of one another via separators. In the present specification, for the convenience of explanation, the side of the battery case 15 in which there is a sealing unit 17 is defined as "upside", and the side in which there is the bottom of an exterior case 16 is defined as "downside".

FIG. 1 is a sectional view of a nonaqueous electrolyte secondary battery 10 according to an example embodiment. As illustrated in FIG. 1, the nonaqueous electrolyte secondary battery 10 includes an electrode assembly 14, a nonaqueous electrolyte (not shown), and a battery case 15 accommodating the electrode assembly 14 and the nonaqueous electrolyte. The electrode assembly 14 includes a positive electrode 11, a negative electrode 12, and a separator 13 interposed between the positive electrode 11 and the negative electrode 12. The electrode assembly 14 has a wound structure in which the positive electrode 11 and the negative electrode 12 are wound together via the separator 13. The battery case 15 is composed of a bottomed cylindrical exterior case 16, and a sealing unit 17 that closes the opening of the exterior case 16. Further, the nonaqueous electrolyte secondary battery 10 includes a resin gasket 28 disposed between the exterior case 16 and the sealing unit 17.

The nonaqueous electrolyte includes a nonaqueous solvent and an electrolyte salt dissolved in the nonaqueous solvent. Examples of the nonaqueous solvents include esters, ethers, nitriles, amides, and mixtures of two or more kinds of these solvents. The nonaqueous solvent may include a halogenated solvent resulting from the substitution of the above solvent with a halogen atom such as fluorine in place of at least part of hydrogen. The nonaqueous electrolyte is not limited to a liquid electrolyte and may be a solid electrolyte using a gelled polymer or the like. The electrolyte salt may be a lithium salt such as $LiPF_6$.

The electrode assembly 14 has a long positive electrode 11, a long negative electrode 12, two long sheets of separators 13, a positive electrode lead 20 coupled to the positive electrode 11, and a negative electrode lead 21 coupled to the negative electrode 12. To prevent the deposition of lithium, the negative electrode 12 is one size larger than the positive electrode 11. Specifically, the negative electrode 12 is formed larger than the positive electrode 11 in the longer direction and the shorter direction (the vertical direction). The two sheets of separators 13 are one size larger than at least the positive electrode 11, and are arranged, for example, so as to interpose the positive electrode 11 therebetween.

Insulating plates 18 and 19 are disposed on and under the electrode assembly 14, respectively. In the example illustrated in FIG. 1, the positive electrode lead 20 attached to the positive electrode 11 extends toward the sealing unit 17 through a through-hole in the insulating plate 18, and the negative electrode lead 21 attached to the negative electrode 12 extends to the bottom of the exterior case 16 through an outside of the insulating plate 19. The positive electrode lead 20 is connected to the lower surface of a filter 23, which is the bottom plate of the sealing unit 17, by welding or the like. A cap 27, which is the top plate of the sealing unit 17, is electrically connected to the filter 23 and serves as a positive electrode terminal. The negative electrode lead 21 is connected to the inner surface of the bottom of the exterior case 16 by welding or the like, and the exterior case 16 serves as a negative electrode terminal.

The exterior case 16 is a bottomed cylindrical metal container. The gasket 28 is disposed between the exterior case 16 and the sealing unit 17 to seal tightly the space inside the battery case 15. The exterior case 16 has a groove portion 22 which is formed by, for example, pressing a lateral surface portion from the outside and which supports the sealing unit 17 thereon. The groove portion 22 is preferably disposed in an annular shape along the circumferential direction of the exterior case 16, and supports the sealing unit 17 on the upper surface thereof. An upper end portion of the exterior case 16 is bent inward along the peripheral edge of the sealing unit 17 to fix the sealing unit 17.

The sealing unit 17 has a structure in which the filter 23, a lower valve 24, an insulating member 25, an upper valve 26 and the cap 27 are stacked in this order from the electrode assembly 14 side. The members constituting the sealing unit 17 each have, for example, a disk shape or a ring shape, and the members except the insulating member 25 are electrically connected to one another. The lower valve 24 and the upper valve 26 are connected to each other at their central portions, and the insulating member 25 is interposed between peripheral portions of the valves. In the event where the inner pressure of the battery is increased, the lower valve 24 is deformed so as to push the upper valve 26 toward the cap 27 and ruptures to interrupt the current path between the lower valve 24 and the upper valve 26. If the inner pressure is further elevated, the upper valve 26 is ruptured and allows the gas to be discharged through the opening in the cap 27.

Hereinbelow, the elements constituting the electrode assembly 14 will be described in detail, with particular emphasis placed on the separator 13.

[Positive Electrodes]

The positive electrode 11 has a positive electrode core 11a and a positive electrode mixture layer 11b disposed on the positive electrode core 11a. The positive electrode core 11a may be, for example, a foil of a metal that is stable at the potentials of the positive electrode 11, such as aluminum or aluminum alloy, or a film having such a metal as a skin layer. The positive electrode mixture layer 11b includes a positive electrode active material, a conductive agent such as acetylene black, and a binder such as polyvinylidene fluoride (PVdF), and is preferably provided on both sides of the positive electrode core 11a. The positive electrode 11 may be fabricated by applying a positive electrode mixture slurry including components such as a positive electrode active material, a conductive agent and a binder onto a positive electrode core 11a, drying the wet films, and compressing the coatings to form positive electrode mixture layers 11b on both sides of the positive electrode core 11a.

The positive electrode active material may be, for example, a lithium metal composite oxide. Examples of the metal elements contained in the lithium metal composite oxide include Ni, Co, Mn, Al, B, Mg, Ti, V, Cr, Fe, Cu, Zn, Ga, Sr, Zr, Nb, In, Sn, Ta and W. A preferred example of the lithium metal composite oxides is a lithium metal composite oxide containing at least one of Ni, Co and Mn. Specific examples include a lithium metal composite oxide containing Ni, Co and Mn, and a lithium metal composite oxide containing Ni, Co and Al. For example, inorganic particles such as tungsten oxide, aluminum oxide and lanthanoid-containing compounds may be attached to the surface of particles of the lithium metal composite oxide.

[Negative Electrodes]

The negative electrode 12 has a negative electrode core 12a and a negative electrode mixture layer 12b disposed on the negative electrode core 12a. The negative electrode core 12a may be, for example, a foil of a metal that is stable at the potentials of the negative electrode 12, such as copper or copper alloy, or a film having such a metal as a skin layer. The negative electrode mixture layer 12b includes a negative electrode active material and a binder such as styrene-butadiene rubber (SBR), and is preferably provided on both sides of the negative electrode core 12a. The negative electrode 12 may be fabricated by applying a negative electrode mixture slurry including components such as a negative electrode active material and a binder onto a negative electrode core 12a, drying the wet films, and compressing the coatings to form negative electrode mixture layers 12b on both sides of the negative electrode core 12a.

The negative electrode active material may be, for example, a graphite. Examples thereof include natural graphites such as flake graphite, vein graphite and amorphous graphite, and artificial graphites such as vein artificial graphite and graphitized mesophase carbon microbeads. The negative electrode active material may be other material such as a metal alloyable with lithium such as Si or Sn, an alloy containing such a metal, or a compound containing such a metal, alone or in combination with a graphite. Specific examples of such compounds include silicon compounds represented by $SiO_x$ ($0.5 \leq x \leq 1.6$).

[Separators]

The separator 13 includes a porous polyolefin substrate 13a and a heat resistant layer 13b disposed on a side of the substrate 13a. The heat resistant layer 13b includes an aramid resin, and offers enhanced heat resistance of the separator 13. In the event of abnormal heating of the battery, the separator 13 maintains its shape by virtue of its containing the heat resistant layer 13b, and can thereby prevent the occurrence of internal short-circuiting. The aramid resin forming the heat resistant layer 13b has a ratio (B/A) of 0.94 to 1.14 wherein A is the absorbance at a wavelength of 1318 $cm^{-1}$ and B is the absorbance at a wavelength of 1650 $cm^{-1}$ in an infrared absorption spectrum obtained by infrared spectroscopic measurement. Details will be described later.

The porosity of the separator 13 is, for example, 30% to 70%. The porosity of the separator 13 is determined by the porosity of the substrate 13a. The void content of the separator 13 is measured by the following method.
(1) The separator 13 is punched into a circle with a diameter of 2 cm, and the central thickness h and mass w of the punched piece of the separator 13 are measured.
(2) From the thickness h and the mass w, the volume V and mass W of the piece are determined. The void content E is calculated from the following equation.

Void content ε (%)=((ρV−W)/(ρV))×100

ρ: Density of the material constituting the separator 13.

The substrate 13a is composed of a porous sheet having ion permeability and insulating properties, for example, a microporous thin film, a woven fabric or a nonwoven fabric. Examples of the polyolefins forming the substrates 13a include polyethylene, polypropylene, and copolymers of polyethylene and α-olefins. The substrate 13a is composed mainly of a polyolefin, and may include a resin material other than polyolefins. The substrate 13a may have a monolayer structure or a multilayer structure such as a polyethylene/polypropylene/polyethylene trilaminar structure. The thickness of the substrate 13a is not particularly limited, but is preferably 3 to 20 μm, and more preferably 5 to 15 μm.

The heat resistant layer 13b may be formed on both sides of the substrate 13a, but is preferably formed on one side of the substrate 13a from points of view such as productivity. In the example illustrated in FIG. 1, the heat resistant layer 13b is disposed on the side of the substrate 13a opposed to the positive electrode 11. For example, the heat resistant layer 13b is formed over substantially the entirety of one side of the substrate 13a. The separator 13 is preferably arranged between the positive electrode 11 and the negative electrode 12 so that the heat resistant layer 13b is opposed to the positive electrode 11. Similarly to the substrate 13a, the heat resistant layer 13b is porous and has ion permeability and insulating properties. The thickness of the heat resistant layer 13b is not particularly limited, but is preferably smaller than the thickness of the substrate 13a and is, for example, 0.5 to 5 μm.

The heat resistant layer 13b preferably further includes inorganic particles. The addition of inorganic particles to the heat resistant layer 13b further enhances the heat resistance of the heat resistant layer 13b. The content of the inorganic particles is preferably 45 to 90 mass %, more preferably 50 to 85 mass %, and particularly preferably 55 to 80 mass % of the total mass of the heat resistant layer 13b. In other words, the content of the aramid resin is preferably 10 to 55 mass %, more preferably 15 to 50 mass %, and particularly preferably 20 to 45 mass % of the total mass of the heat resistant layer 13b.

As described hereinabove, the aramid resin forming the heat resistant layer 13b satisfies the absorbance ratio (B/A) of 0.94 to 1.14 at the specified wavelengths in an infrared absorption spectrum. While still achieving the object of the present disclosure, the heat resistant layer 13b may include a resin that does not satisfy the above condition. The aramid resin satisfying the above condition preferably represents 80 to 100 mass % of the resin component(s) constituting the heat resistant layer 13b. Hereinafter, the term aramid resin means an aramid resin satisfying the above condition unless otherwise specified.

A Fourier transform infrared spectrophotometer (FT-IR) is used for the infrared spectroscopic measurement of the aramid resin. In an infrared absorption spectrum of the aramid resin, the absorption at a wavelength of 1318 $cm^{-1}$ is assigned to C—N in the amide bonds, and the absorption at a wavelength of 1650 $cm^{-1}$ is assigned to C=O in the amide bonds. The bonds, in particular, the C—N bonds are significantly affected depending on whether the C=O bonds are in the para-positions or the meta-positions relative to the C—N bonds, giving rise to a change in the ratio (B/A) of the absorbance B at 1650 $cm^{-1}$ wavelength to the absorbance A at 1318 $cm^{-1}$ wavelength. The present inventors have found that the heat resistant layer 13b exhibits high heat resistance and good adhesion with respect to the substrate 13a when it satisfies the absorbance ratio (B/A) of 0.94 to 1.14.

For example, the aramid resin forming the heat resistant layer 13b is a mixture of a para-aramid resin and a meta-aramid resin, or a copolymer containing a para-aramid skeleton and a meta-aramid skeleton. When the aramid resin is a mixture of a para-aramid resin and a meta-aramid resin, the mixing ratio of these resins needs to be controlled so that the above-described absorbance ratio (B/A) is satisfied. When the aramid resin is a copolymer containing a para-aramid skeleton and a meta-aramid skeleton, the copolymerization ratio needs to be controlled so as to satisfy the above-described absorbance ratio (B/A).

When the aramid resin is a mixture of a para-aramid resin and a meta-aramid resin, the content of the para-aramid resin is preferably 40 to 90 mass %, and more preferably 50 to 75 mass % of the total mass of the aramid resin. That is, the content of the meta-aramid resin is preferably 10 to 60 mass %, and more preferably 25 to 50 mass % of the aramid resin. If the content of the para-aramid resin is less than 40 mass %, the absorbance ratio (B/A) may exceed 1.14 and the thermal decomposition temperature of the resin may be lowered with the result that the separator 13 tends to be thermally shrunk or broken in the event of, for example, abnormal heating of the battery. If, on the other hand, the content of the para-aramid resin is more than 90 mass %, the absorbance ratio (B/A) may fall below 0.94 and the flexibility of the resin may be lowered to cause a decrease in the adhesion between the substrate 13a and the heat resistant layer 13b with the result that the heat resistant layer 13b is easily detached due to a frictional force acting thereon during, for example, the fabrication of the electrode assembly 14.

When the aramid resin is a copolymer containing a para-aramid skeleton and a meta-aramid skeleton, the content of the para-aramid skeleton is preferably 40 to 90 mass %, and more preferably 50 to 75 mass % of the total mass of the aramid resin. That is, the content of the meta-aramid skeleton in the aramid resin is preferably 10 to 60 mass %, and more preferably 25 to 50 mass %. If the copolymerization ratio of the para-aramid component and the meta-aramid component falls out of the above range, the heat resistance of the separator 13 may be decreased and the adhesion between the substrate 13a and the heat resistant layer 13b may de lowered similarly to the case of the mixture described above.

For example, a para-aramid resin and a meta-aramid resin may be mixed in such a manner that respective solutions of the resins are mixed together or in such a manner that one of the resins is a powder and is admixed with a solution of the other resin. In particular, it is preferable that a powder of a meta-aramid resin be dissolved into a solution of a para-aramid resin to give a mixed solution of the para-aramid resin and the meta-aramid resin. In this case, the mixed solution is prepared easily. For example, a para-aramid resin is synthesized in a solvent and, without collecting the para-aramid resin from the solvent, the solvent is used directly as the solution of the para-aramid resin.

For example, the para-aramid resin may be synthesized by subjecting a para-oriented aromatic diamine and a para-oriented aromatic dicarboxylic acid halide to a condensation polymerization reaction in an organic solvent. Examples of the para-oriented aromatic diamines include paraphenylenediamine, 4,4'-diaminobiphenyl and 2-methyl-paraphenylenediamine. Examples of the para-oriented aromatic dicarboxylic acid halides include terephthalic acid dichloride, biphenyl-4,4'-dicarboxylic acid chloride and 2-chloroterephthalic acid dichloride.

For example, the meta-aramid resin may be synthesized by subjecting a meta-oriented aromatic diamine and a meta-oriented aromatic dicarboxylic acid halide to a condensation polymerization reaction in an organic solvent. Examples of the meta-oriented aromatic diamines include 1,3-phenylenediamine, 1,6-naphthalenediamine and 1,7-naphthalenediamine. Examples of the meta-oriented aromatic dicarboxylic acid halides include isophthalic acid, 1,6-naphthalenedicarboxylic acid and 1,7-naphthalenedicarboxylic acid. The organic solvent may be removed after the polycondensation, and the meta-aramid resin may be recovered as a powder. A resin solution may be prepared easily by dissolving the powder into a desired organic solvent.

Examples of the solvents which may be used in the polymerization and dissolution of the para-aramid resins and the meta-aramid resins include polar amide solvents and polar urea solvents. Specific examples thereof include, but are not limited to, N,N-dimethylformamide, N,N-dimethylacetamide, N-methyl-2-pyrrolidone and tetramethylurea.

The copolymer containing a para-aramid skeleton and a meta-aramid skeleton may be synthesized by mixing a para-oriented aromatic diamine described hereinabove, a para-oriented aromatic dicarboxylic acid halide described hereinabove, a meta-oriented aromatic diamine described hereinabove and a meta-oriented aromatic dicarboxylic acid halide described hereinabove in a predetermined mass ratio and subjecting the mixture to a condensation polymerization reaction. A polar amide solvent, a polar urea solvent or the like may be used in the synthesis of the copolymer.

The inorganic particles contained in the heat resistant layer 13b are composed of an insulating inorganic compound that will not be melted or decomposed when the battery generates abnormal heat. Some examples of the inorganic particles are particles of metal oxides, metal oxide hydrates, metal hydroxides, metal nitrides, metal carbides and metal sulfates. The average particle size of the inorganic particles is, for example, 0.05 to 2 μm.

Examples of the metal oxides and the metal oxide hydrates include aluminum oxide (alumina), boehmite ($Al_2O_3H_2O$ or AlOOH), magnesium oxide, titanium oxide, zirconium oxide, silicon oxide, yttrium oxide and zinc oxide. Examples of the metal nitrides include silicon nitride, aluminum nitride, boron nitride and titanium nitride. Examples of the metal carbides include silicon carbide and boron carbide. Examples of the metal sulfates include barium sulfate. Examples of the metal hydroxides include aluminum hydroxide.

Further, the inorganic particles may be particles of a porous aluminosilicate salt such as zeolite ($M_{2/n}O \cdot Al_2O_3 \cdot xSiO_2 \cdot yH_2O$ wherein M denotes a metal element, $x \geq 2$, and $y \geq 0$), a layered silicate salt such as talc ($Mg_3Si_4O_{10}(OH)_2$), barium titanate, strontium titanate or the like. In particular, at least one selected from alumina, boehmite, talc, titanium oxide and magnesium oxide is preferable from points of view such as insulating properties and heat resistance.

The heat resistant layer 13b may be formed by applying a mixed solution of a para-aramid resin and a meta-aramid resin or a solution of a copolymer containing a para-aramid skeleton and a meta-aramid skeleton to the surface of a substrate 13a. A heat resistant layer 13b containing inorganic particles may be formed by adding inorganic particles to the resin solution. Examples of the methods for applying the resin solution (the methods for forming a film) include die extrusion, bar coating and dipping. After the resin solution is applied to the surface of the substrate 13a, the coating may be dried to remove the solvent, or the substrate 13a may be immersed in a coagulation bath to remove the solvent. The coagulation bath may include a solvent that is the same as the solvent used in the resin solution, and a solvent such as water that is inert and compatible with the above solvent.

EXAMPLES

Hereinbelow, the present disclosure will be further described based on EXAMPLES. However, it should be construed that the scope of the present disclosure is not limited to such EXAMPLES.

Example 1

[Fabrication of Positive Electrode]

A positive electrode mixture slurry was prepared by mixing 100 parts by mass of $LiNi_{0.88}Co_{0.09}Al_{0.03}O_2$, 1 part by mass of acetylene black, and 0.9 parts by mass of polyvinylidene fluoride, and adding an appropriate amount of N-methyl-2-pyrrolidone (NMP). Next, the positive electrode mixture slurry was applied to both sides of a long positive electrode core made of a 15 μm thick aluminum foil, and the wet films were dried. The dried coatings were compressed using a roller, and the unit was cut into a predetermined electrode size. A positive electrode (thickness: 0.144 mm, width: 62.6 mm, length: 861 mm) was thus fabricated which had positive electrode mixture layers on both sides of the positive electrode core. A portion of the current collector located at the center in the longitudinal direction was left exposed from the mixture layer, and a positive electrode lead made of aluminum was welded to the surface of this exposed portion of the positive electrode.

[Fabrication of Negative Electrode]

A negative electrode mixture slurry was prepared by mixing 95 parts by mass of a graphite powder, 5 parts by mass of Si oxide, 1 part by mass of sodium carboxymethylcellulose and 1 part by mass of styrene-butadiene rubber as a dispersion, and adding an appropriate amount of water. Next, the negative electrode mixture slurry was applied to both sides of a long negative electrode current collector made of an 8 μm thick copper foil, and the wet films were dried. The dried coatings were compressed using a roller, and the unit was cut into a predetermined electrode size. A negative electrode (thickness: 0.160 mm, width: 64.2 mm, length: 959 mm) was thus fabricated which had negative electrode mixture layers on both sides of the negative electrode current collector. A portion of the current collector located at an end in the longitudinal direction (at an end that would define the outer end of a wound electrode assembly) was left exposed from the mixture layer, and a negative electrode lead made of nickel was welded to the surface of this exposed portion of the negative electrode.

[Fabrication of Separator]

Paraphenylenediamine and terephthalic acid dichloride as raw materials were subjected to a polycondensation reaction in NMP to give a solution of a para-aramid resin having a solid concentration of 3 mass %. Further, a powder of polymetaphenylene isophthalamide (Conex manufactured by TEIJIN LIMITED) was provided as a meta-aramid resin. 10 Parts by mass of the powder was dissolved into 90 parts by mass of NMP to give a meta-aramid resin solution. The resin solutions were mixed with each other so that the content of the para-aramid resin would be 40 mass % of the total mass of the para-aramid resin and the meta-aramid resin. Alumina particles (AKP3000 manufactured by Sumitomo Chemical Co., Ltd.) were added to the resin solution. A heat resistant coating liquid was thus prepared. The amount of the alumina particles added was 200 parts by mass with respect to 100 parts by mass of the solid (the aramid resins), and the particles were mixed and dispersed uniformly. The coating liquid was applied to one side of a porous substrate (thickness: 10 μm) made of polyethylene and was coagulated by being immersed in ion-exchange water. Thereafter, the film was washed with running ion-exchange water and was dried to remove water. A separator was thus obtained.

[Fabrication of Electrode Assembly]

A wound electrode assembly was fabricated by coiling the positive electrode and the negative electrode together via the separator.

[Preparation of Nonaqueous Electrolytic Solution]

Ethylene carbonate (EC) and dimethyl carbonate (DMC) were mixed together in a volume ratio of EC:DMC=3:7. To the mixed solvent, 5 mass % vinylene carbonate was added. $LiPF_6$ was dissolved with a concentration of 1.5 mol/L. A nonaqueous electrolytic solution was thus prepared.

[Fabrication of Battery]

Insulating plates were arranged on and under the electrode assembly. The negative electrode lead was welded to a battery case, and the positive electrode lead was welded to a sealing unit. The electrode assembly was then placed into the exterior case. Thereafter, the nonaqueous electrolytic solution was poured into the exterior case, and the battery case was sealed by crimping the open end of the exterior case to fix the sealing unit via a gasket. A cylindrical nonaqueous electrolyte secondary battery was thus fabricated. The battery capacity was 4600 mAh.

Example 2

A separator and a battery were fabricated in the same manner as in EXAMPLE 1, except that the content of the para-aramid resin was changed to 50 mass %.

Example 3

A separator and a battery were fabricated in the same manner as in EXAMPLE 1, except that the content of the para-aramid resin was changed to 75 mass %.

Example 4

A separator and a battery were fabricated in the same manner as in EXAMPLE 1, except that the content of the para-aramid resin was changed to 90 mass %.

Comparative Example 1

A separator and a battery were fabricated in the same manner as in EXAMPLE 1, except that the para-aramid resin (absorbance ratio (B/A): 0.91) alone was used as the aramid resin for forming the heat resistant layer.

Comparative Example 2

A separator and a battery were fabricated in the same manner as in EXAMPLE 1, except that the meta-aramid resin (absorbance ratio (B/A): 1.51) alone was used as the aramid resin for forming the heat resistant layer.

Comparative Example 3

A separator and a battery were fabricated in the same manner as in EXAMPLE 1, except that the content of the para-aramid resin was changed to 25 mass % and the absorbance ratio (B/A) was 1.24.

Example 5

A separator and a battery were fabricated in the same manner as in EXAMPLE 1, except that the heat resistant layer was formed using the following coating liquid.

In NMP, 40 parts by mass of raw materials for a para-aramid component (paraphenylenediamine and terephthalic acid dichloride) and 60 parts by mass of raw materials for a meta-aramid component (1,3-phenylenediamine and isophthalic acid) were subjected to a copolymerization condensation reaction to give a solution of a copolymer containing a para-aramid skeleton and a meta-aramid skeleton. Alumina particles (AKP3000 manufactured by Sumitomo Chemical Co., Ltd.) were added to the resin solution. A heat resistant coating liquid was thus prepared. The amount of the alumina particles added was 200 parts by mass with respect to 100 parts by mass of the solid (the aramid resin), and the particles were mixed and dispersed uniformly.

Example 6

A separator and a battery were fabricated in the same manner as in EXAMPLE 5, except that the mass ratio of the raw materials for the para-aramid component to the raw materials for the meta-aramid component was changed to 50:50.

Example 7

A separator and a battery were fabricated in the same manner as in EXAMPLE 5, except that the mass ratio of the raw materials for the para-aramid component to the raw materials for the meta-aramid component was changed to 75:25.

Example 8

A separator and a battery were fabricated in the same manner as in EXAMPLE 5, except that the mass ratio of the raw materials for the para-aramid component to the raw materials for the meta-aramid component was changed to 90:10.

Comparative Example 4

A separator and a battery were fabricated in the same manner as in EXAMPLE 5, except that the mass ratio of the raw materials for the para-aramid component to the raw materials for the meta-aramid component was changed to 25:75, and the absorbance ratio (B/A) was 1.24.

The separators and the batteries of EXAMPLES and COMPARATIVE EXAMPLES were tested by the following methods to measure infrared absorption spectra, to evaluate the detachment resistance of the heat resistant layers, and to examine external short-circuiting in the batteries. The evaluation results are described in Table 1.

[Measurement of Infrared Absorption Spectrum]

The heat resistant layer (the resin forming the heat resistant layer) disposed on the surface of the separator was analyzed by infrared spectroscopic measurement in the following manner. The infrared absorption spectrum obtained was analyzed to determine the absorbance A at 1318 $cm^{-1}$ wavelength and the absorbance B at 1650 $cm^{-1}$ wavelength, thereby calculating the absorbance ratio (B/A).

Device: TENSOR 2 manufactured by Bruker Optics

Measurement method: ATR method (single reflection ATR method)

Prism: Germanium

Incident angle: 45°

Measurement wavelengths: 4000-600 $cm^{-1}$

Number of scans: 64 times

[Evaluation of Detachment Resistance of Heat Resistant Layer]

The detachment resistance of the heat resistant layer was evaluated by the following method.

A small piece 5 cm in length and 5 cm in width that had been cut from the separator was fixed to a glass plate. The surface of the piece was rubbed with abrasive paper (water resistant abrasive paper DCCS-500 manufactured by Sankyo-Rikagaku Co., Ltd.) under a load of 100 g three times. The tested separator was photographed with respect to an area 2 cm in length×2 cm in width, and the image was analyzed to calculate the ratio of the area of the detached heat resistant layer to the measurement area.

[External Short-Circuiting Examination]

At an environmental temperature of 25° C., the batteries of EXAMPLES and COMPARATIVE EXAMPLES were each charged at a constant current of 1380 mA (0.3 C) to a battery voltage of 4.2 V and charged at the constant voltage to a cutoff current of 92 mA. The charged batteries were subjected to an external short-circuiting test at an environmental temperature of 60° C. and a short-circuit resistance of 15 mΩ. The battery voltage was monitored for the presence or absence of a discontinuous large voltage drop of Δ0.1 V or more. Such a discontinuous voltage drop is a behavior observed when a negative electrode lead generates heat due to the flow of a short-circuit current in the event of external short-circuiting and a separator is thermally shrunk and broken to cause a short circuit between the negative electrode lead and a positive electrode.

TABLE 1

| | Aramid resin | Para-aramid | Absorbance ratio (B/A) | Area of detached heat resistant layer | Presence or absence of short-circuit behavior |
|---|---|---|---|---|---|
| EX. 1 | Mixture | 40 mass % | 1.14 | 33.1% | Absent |
| EX. 2 | Mixture | 50 mass % | 1.09 | 41.0% | Absent |
| EX. 3 | Mixture | 75 mass % | 0.99 | 47.2% | Absent |
| EX. 4 | Mixture | 90 mass % | 0.94 | 49.8% | Absent |
| COMP. EX. 1 | Para-aramid alone | 100 mass % | 0.91 | 60.9% | Absent |
| COMP. EX. 2 | Meta-aramid alone | 0 mass % | 1.51 | 23.5% | Present |
| COMP. EX. 3 | Mixture | 25 mass % | 1.24 | 25.2% | Present |
| EX. 5 | Copolymer | 40 mass % | 1.13 | 32.1% | Absent |
| EX. 6 | Copolymer | 50 mass % | 1.11 | 39.2% | Absent |
| EX. 7 | Copolymer | 75 mass % | 1.00 | 47.5% | Absent |
| EX. 8 | Copolymer | 90 mass % | 0.95 | 49.2% | Absent |
| COMP. EX. 4 | Copolymer | 25 mass % | 1.24 | 26.5% | Present |

As described in Table 1, the batteries of EXAMPLES did not show a large voltage drop during the external short-circuiting test. The reason for these results is probably because the separators of EXAMPLES had high heat resistance and were not broken or thermally shrunk by the heat from the negative electrode lead during the external short-circuiting. Further, the separators of EXAMPLES had high adhesion between the porous substrate and the heat resistant layer, and the heat resistant layer was resistant to detachment. Thus, the separators of EXAMPLES are unlikely to suffer detachment of the heat resistant layer due to a frictional force exerted thereon by a feed roller when, for example, the separator is fed during the fabrication of an electrode assembly.

REFERENCE SIGNS LIST

10 NONAQUEOUS ELECTROLYTE SECONDARY BATTERY, 11 POSITIVE ELECTRODE, 11a POSITIVE ELECTRODE CORE, 11b POSITIVE ELECTRODE MIXTURE LAYER, 12 NEGATIVE ELECTRODE, 12a NEGATIVE ELECTRODE CORE, 12b NEGATIVE ELECTRODE MIXTURE LAYER, 13 SEPARATOR, 13a SUBSTRATE, 13b HEAT RESISTANT LAYER, 14 ELECTRODE ASSEMBLY, 15 BATTERY CASE, 16 EXTERIOR CASE, 17 SEALING UNIT, 18, 19 INSULATING PLATES, 20 POSITIVE ELECTRODE LEAD, 21 NEGATIVE ELECTRODE LEAD, 22 GROOVE PORTION, 23 FILTER, 24 LOWER VALVE, 25 INSULATING MEMBER, 26 UPPER VALVE, 27 CAP, 28 GASKET

The invention claimed is:

1. A nonaqueous electrolyte secondary battery separator comprising a porous polyolefin substrate and a heat resistant layer disposed on a side of the substrate, wherein
the heat resistant layer comprises an aramid resin,
the aramid resin has a ratio (B/A) of 0.94 to 1.14 wherein A is the absorbance at a wavelength of 1318 $cm^{-1}$ and B is the absorbance at a wavelength of 1650 $cm^{-1}$ in an infrared absorption spectrum obtained by infrared spectroscopic measurement, and
wherein the aramid resin is a copolymer containing a para-aramid skeleton and a meta-aramid skeleton.

2. The nonaqueous electrolyte secondary battery separator according to claim 1, wherein the heat resistant layer further comprises inorganic particles.

3. The nonaqueous electrolyte secondary battery separator according to claim 1, wherein the content of the para-aramid skeleton is 40 to 90 mass % of the aramid resin.

4. A nonaqueous electrolyte secondary battery comprising:
- a positive electrode,
- a negative electrode, and
- a nonaqueous electrolyte secondary battery separator of claim 1 interposed between the positive electrode and the negative electrode.

5. A method for producing a nonaqueous electrolyte secondary battery separator including a polyolefin substrate and a heat resistant layer disposed on a side of the substrate, the method comprising:
- a step of dissolving a meta-aramid resin powder into a solution of a para-aramid resin to prepare a mixed solution of the para-aramid resin and the meta-aramid resin, and
- a step of applying the mixed solution onto a side of the substrate to form the heat resistant layer.

6. The method according to claim 5 for producing a nonaqueous electrolyte secondary battery separator, wherein the method further comprises adding inorganic particles to the mixed solution, and the heat resistant layer formed contains the inorganic particles.

7. A nonaqueous electrolyte secondary battery comprising:
- a positive electrode,
- a negative electrode, and
- a nonaqueous electrolyte secondary battery separator of claim 2 interposed between the positive electrode and the negative electrode.

8. A nonaqueous electrolyte secondary battery comprising:
- a positive electrode,
- a negative electrode, and
- a nonaqueous electrolyte secondary battery separator of claim 3 interposed between the positive electrode and the negative electrode.

\* \* \* \* \*